Nov. 29, 1949  H. C. GRANT, JR  2,489,286
DUST COLLECTING AND OPTICAL MEASURING DEVICE
Filed May 17, 1946  2 Sheets-Sheet 1

INVENTOR.
HARRY C. GRANT JR.
BY
*[signature]* Montgomery
ATTORNEY

Nov. 29, 1949     H. C. GRANT, JR     2,489,286
DUST COLLECTING AND OPTICAL MEASURING DEVICE
Filed May 17, 1946     2 Sheets-Sheet 2

INVENTOR.
HARRY C. GRANT JR.
BY
ATTORNEY

Patented Nov. 29, 1949

2,489,286

UNITED STATES PATENT OFFICE 2,489,286

DUST COLLECTING AND OPTICAL MEASURING DEVICE

Harry C. Grant, Jr., Ridgewood, N. J., assignor to Specialties Development Corporation, Bloomfield, N. J., a corporation of New Jersey Application May 17, 1946, Serial No. 670,423

3 Claims. (Cl. 88—14)

1

This invention relates to dust detection apparatus and particularly to apparatus designed to indicate or record the presence of dust in the atmosphere or other gaseous fluid medium, or to preserve samples of such dust.

In many manufacturing processes, presence of dust in the atmosphere becomes of extreme importance due to the fact that such dust coming in contact with an article in the process of manufacturing may seriously affect the quality of such an article. For example, in the manufacture of photographic film and plastic objects it is extremely important that the dust in the atmosphere to which the article is exposed during manufacture be held to a minimum in order to avoid injuring the article. Likewise, in the manufacture of precision machinery and instruments it is vital to hold the dust content of the air to a minimum, and therefore it is essential to have proper means of detecting and recording the amount of dust present in the air.

In many manufacturing and mining processes the presence of particles of dust in the air presents a serious health hazard. For instance, in mining and tunnelling operations the presence of finely divided particles of silica in the air produces the occupational disease of "silicosis" which is an irritation of the respiratory passages by such dust. Here again it becomes of extreme importance to have means of detecting the amount of dust present in the air as well as the type of dust present and to preserve permanently, samples of dust collected from the air.

An object of this invention is to provide a method and apparatus for detecting the presence of dust in the air or other gaseous fluid medium.

Another object of the invention is to provide apparatus to give an indication when the concentration of dust in the air becomes excessive.

Another object of the invention is to provide apparatus for making a permanent record of the concentration of dust in the air.

Another object of the invention is to provide apparatus for collecting dust samples in a form convenient for preservation as a record.

Another object of the invention is to provide apparatus of the above type which is adapted to be used with an air duct.

A further object is to provide an apparatus of the above-indicated character which is simple and durable in construction, economical to manufacture, and effective in its operation.

Further objects, not specifically enumerated above, will be apparent as the invention is described in greater detail in connection with the accompanying drawings, wherein.

Figure 1:
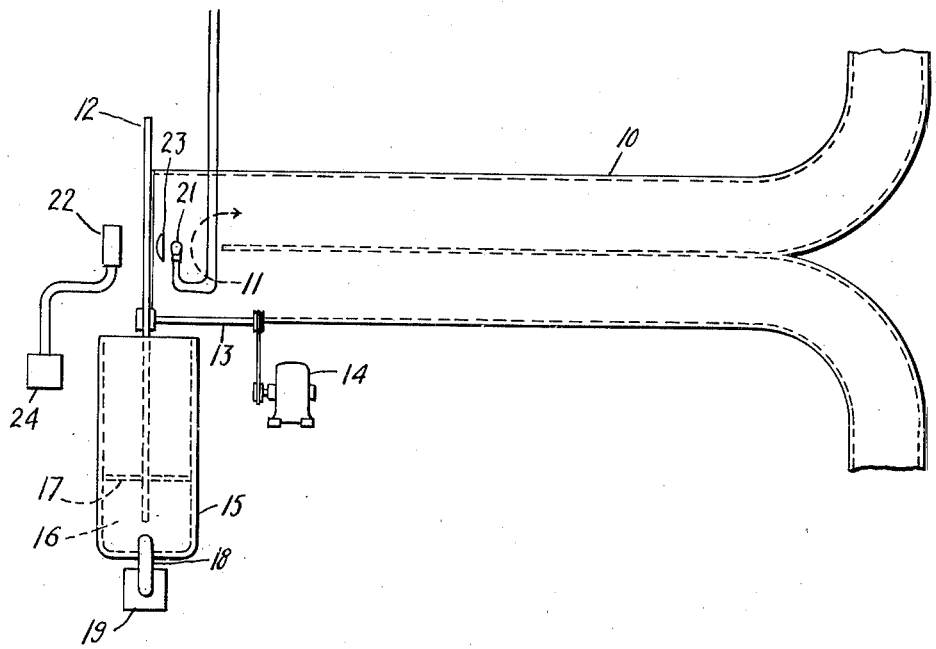
Figure 1 is a diagrammatic elevational view of apparatus illustrating an embodiment of the invention and adapted for practicing the method thereof.

Referring to Figure 1, there is shown a passage 10 for a gaseous fluid medium, generally referred to in the specification as "air" although it will be apparent that the apparatus about to be described may be used for the detection of dust concentration in any gaseous fluid medium.

The passage 10 as shown in Figure 1 has walls defining a reverse bend portion 11 provided with an opening across which a plate 12 of transparent material, such as glass or plastic and of generally circular outline, is rotatively mounted on a shaft 13 for revolution within its plane.

Figure 2:
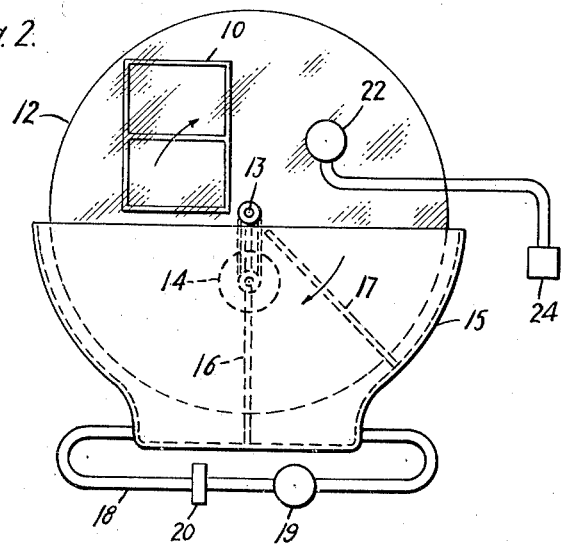
Figure 2 is a diagrammatic end elevational view of the apparatus shown in Figure 1.

As generally indicated in Figures 1 and 2, the opening is adjacent a portion of the upper half of the plate 12. A source of power such as a small electric motor 14 is provided to drive the shaft 13 and thus cause rotation of the plate 12 either intermittently or as slowly as desired.

The plate 12 is preferably mounted in a substantially vertical position, and a tank 15 is provided to contain the lower half of the plate 12 as shown in Figures 1 and 2. The tank 15 is preferably provided with a dividing partition 16 which fits closely against the plate 12 and serves to keep liquid medium within tank 15 from passing from one side to the other thereof. In addition, a cleaning or wiping arm 17 is provided within tank 15, which, together with a liquid medium in tank 15, removes dust collected on the surface of the plate 12 as described hereinafter.

A conduit 18, provided with a pump 19 and filter means 20, extends from one side of the partition 16 of tank 15 to the other side thereof, whereby to conduct liquid from one side of tank 15, filter the liquid to remove the dust therein, and supply clean liquid to the opposite side of tank 15.

Adjacent the passage 10 or within such passage, if desired, a source of light 21 such as an incandescent lamp is provided. A photoelectric cell 22 or other similar light sensitive device is provided on the opposite side of the plate 12 in order to measure the intensity of light falling thereon from the source of light 21 and to indicate any diminution thereof. A lens 23 may be provided if desired in order to concentrate light from the source 21 on the photoelectric cell 22.

Electrical means 24 responsive to cell 22 is provided for indicating or making a permanent record of the intensity of the light directed upon the cell 22.

In the operation of the above described device the tank 15 may be filled with a non-drying or slow drying relatively clear liquid such as oil or glycerin to which dust will adhere. Upon the rotation of the plate 12 by the motor 14, the wetted plate will be exposed to air passing through the passage 10. Inasmuch as a sharp change in direction of air within the passage 10 is caused at the portion 11 thereof, heavy particles in suspension in the air such as dust will impinge to a considerable extent on the wetted surface of the plate 12 and will be retained thereon.

The plate 12 is rotated either intermittently or at a slow, constant speed between the cell 22 and the light source 21, whereby the opacity of the dustcoated portion of the plate, exposed to dust in the passage 10, is measured by the cell 22. After measuring such opacity, the plate portion is then rotated into the tank 15 where the cleaning arm 17, together with the liquid within the tank, serves to remove the dust. Thereafter the portion of the plate passes through the partition 16 into the other portion of the tank 15 where the plate 12 is rewetted with clean liquid before being recycled for exposure to dust.

The pump 19 and filter 20 serve to provide a continuous supply of clean, dust-free liquid within the tank 15.

It is obvious, without departing from the scope of this invention, that either the photoelectric cell 22 or light source 21 may be mounted within the passage 10, or that the plate 12 may be formed of reflective rather than transparent material in which case the light source 21 and cell 22 may be mounted on the same side of the plate 12 to measure the opacity of the dust layer on the plate 12.

Instead of providing the rotating plate 12 and tank 15, it is obvious that a manually placed wetted slide may be exposed for a predetermined length of time to air passing through passage 10 after which time the slide may be removed for determination of its opacity. Such a slide could be covered with a transparent varnish or other material of the desired hardening time in order conveniently to preserve a sample of dust from air passing through the passage 10 as a permanent sample.

Figure 3:
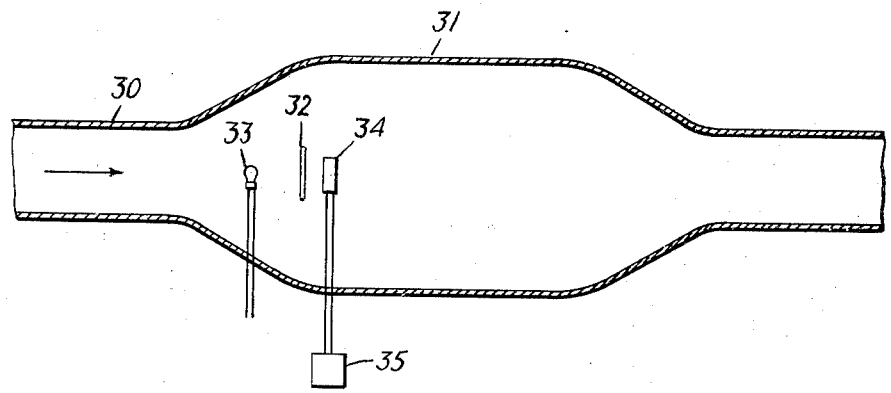
Figure 3 is a diagrammatic elevational view, partly in section, illustrating a modified embodiment.

Instead of the passage 10 generally indicated in Figure 1 having a sharp change of direction at portion 11 thereof, the bend may be less acute or a passage may be constructed as illustrated in Figure 3 of the drawings, wherein a passage 30 for conducting air or other gaseous fluid medium of which the dust content is to be determined has a portion 31 of greater cross-sectional area, in order to decrease the velocity of the fluid flowing therethrough. A plate 32 is mounted in the path of the inflowing gases at the portion 31 by suitable supports, not shown, and a light source 33 and a cell 34 are provided in conjunction with plate 32 to measure the opacity thereof.

This device operates similarly to that previously described except that in the form first described the dust particles are thrown out of the air and against the plate by the inertia due to their own mass without slowing the velocity of the air, while in this modification the velocity of the air is reduced to aid in depositing the particles of dust on the wetted plate.

Figure 4:
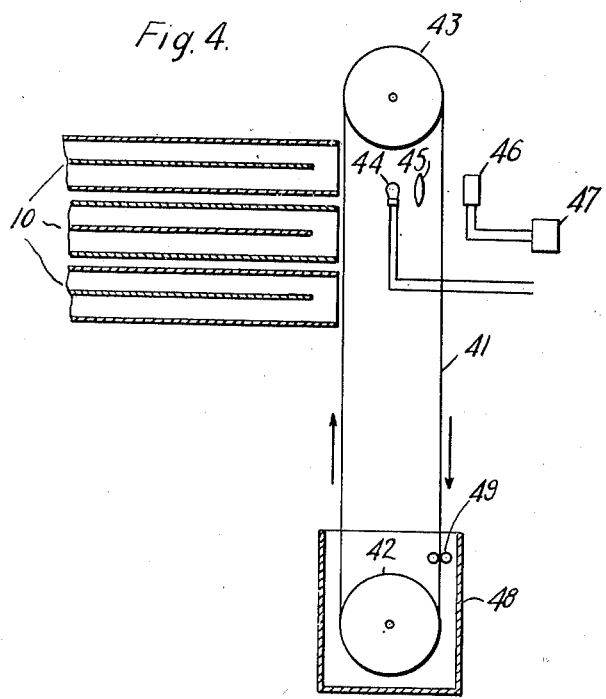
Figure 4 is a diagrammatic elevational view, partly in section, illustrating another modified embodiment.

Another form of apparatus is shown in Figure 4 of the drawings in which a plurality of passages 10 similar to that disclosed in Figure 1, cause dust to be deposited on a wetted, endless film 41 rotated on drums 42 and 43. A conventional source of light 44 having a lens 45 to concentrate the rays, if desired, together with a light sensitive cell 46 measure the opacity of wetted film 41. In this instance, the passages 10 are preferably connected in parallel to a body of air of which the dust content is desired to be known, particularly where low concentrations of dust are encountered.

By exposing the film successively to the air in the passages 10 a thicker layer of dust will be placed thereon which can be measured by the cell 46 with greater accuracy. An indicating or recording means 47 similar to means 24 is actuated by cell 46. In conjunction with the moving film, a tank 48 is provided to clean and rewet the film as previously described and has cleaning brushes 49 to aid in removing the dust therefrom.

In addition to the above described modifications, this invention is capable of being practiced by further modifications not illustrated such as utilizing a plurality of moving films exposed to a steam of dust-laden air for a predetermined time after which such films may be superimposed between a source of light and a light measuring device in order to measure the opacity of the film and thus obtain an indication of the amount of dust carried by the air.

It will be obvious to those skilled in the art that by proper calibration of the indicating or recording means 47 a direct reading of the amount of dust carried by the air to which the plate is exposed may be obtained.

The word "dust" as used in this specification, including the claims, denotes small particles of matter heavier than the gaseous fluid medium and carried therein in suspension.

It will be seen from the foregoing description that the present invention provides an improved method and apparatus whereby with a minimum of effort the dust content of air may be determined. The apparatus is simple, easy to manufacture, assemble and operate, is a compact unit and is durable and reliable in service.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A device for measuring concentration of dust in a gaseous fluid medium comprising an open top container for dust adhesive coating material, a plate, supporting means adjacent the open top of the container on which the plate is mounted for rotation about its axis with a portion of the plate passing through the material in the container whereby to receive a dust adhesive coating, conduit means disposed outside of the container and substantially at right angles to the plate for exposing successive portions of the plate to a current of the medium after receiving the dust adhesive coating and as the plate is rotated, illuminating means disposed adjacent the exposure means at one side of the plate for illuminating the exposed portions thereof, means associated with the illuminating means at the opposite side of the plate for measuring the intensity of light transmitted through said exposed portions, means including a wiper in the container operable subsequent to the measuring means for cleaning the plate, and means for rotating the plate on its axis to bring the exposed portions into juxtaposition with each of said means successively.

2. In combination, a continuous surface; a coating station including an open top container for dust adhesive coating material; means mounting the surface for movement of a portion of the surface through the material in the container for coating the surface to provide a dust adhesive film thereon; a second station including fluid medium conducting means disposed outside of the container substantially at right angles to said surface for subjecting the surface to a current of gaseous medium; a third station including a light source disposed outside of the container at one side of said surface and photoelectric means disposed at the opposite side of said surface in alignment with said light source for measuring the opacity of the surface; a cleaning station including a wiper in the container for cleaning said surface; and driving means for successively advancing portions of the said surface to said stations in the order mentioned.

3. In combination, a continuous surface; a coating station including an open top container for dust adhesive coating material; means mounting the surface for movement of a portion of the surface through the material in the container for coating the surface to provide a dust adhesive film thereon; a second station including fluid medium conducting means disposed outside of the container substantially at right angles to said surface for subjecting the surface to a current of gaseous medium; a third station including a light source disposed outside of the container at one side of said surface and photoelectric means disposed at the opposite side of said surface in alignment with said light source for measuring the opacity of the surface; a cleaning station including a wiper in the container for cleaning said surface; driving means for successively advancing portions of the said surface to said stations in the order mentioned; and means associated with the container for filtering and recirculating the coating material removed from the said surface by the wiper.

HARRY C. GRANT, Jr.

REFERENCES CITED

The following references are of record in the file of this patent:

UNITED STATES PATENTS

| Number | Name | Date |
|---|---|---|
| 2,076,554 | Drinker et al. | Apr. 13, 1937 |

FOREIGN PATENTS

| Number | Country | Date |
|---|---|---|
| 642,167 | Germany | Feb. 24, 1937 |